US010034294B2

United States Patent
Kenney et al.

(10) Patent No.: US 10,034,294 B2
(45) Date of Patent: Jul. 24, 2018

(54) TECHNIQUES FOR PROVIDING FLEXIBLE CLEAR CHANNEL ASSESSMENT DETECTION THRESHOLDS IN A WIRELESS NETWORK

(71) Applicant: Intel Corporation, Santa Clara, CA (US)

(72) Inventors: Thomas J. Kenney, Portland, OR (US); Eldad Perahia, Portland, OR (US); Minyoung Park, Portland, OR (US); Shahrnaz Azizi, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 14/779,992

(22) PCT Filed: Dec. 20, 2013

(86) PCT No.: PCT/US2013/076940
§ 371 (c)(1),
(2) Date: Sep. 25, 2015

(87) PCT Pub. No.: WO2014/209425
PCT Pub. Date: Dec. 31, 2014

(65) Prior Publication Data
US 2016/0050674 A1    Feb. 18, 2016

Related U.S. Application Data

(60) Provisional application No. 61/819,903, filed on May 6, 2013.

(51) Int. Cl.
*H04L 12/50*    (2006.01)
*H04W 72/08*    (2009.01)
(Continued)

(52) U.S. Cl.
CPC ......... *H04W 72/08* (2013.01); *H04W 74/002* (2013.01); *H04W 84/12* (2013.01)

(58) Field of Classification Search
CPC ................................................. H04W 72/0406
(Continued)

(56) References Cited

U.S. PATENT DOCUMENTS

2005/0129051 A1    6/2005    Zhu et al.
2006/0253736 A1    11/2006    Rudolf et al.
(Continued)

OTHER PUBLICATIONS

International Search Report for PCT Patent Application No. PCT/US2013/076940, dated Apr. 22, 2014, 2 pages.
(Continued)

*Primary Examiner* — Dang Ton

(57) ABSTRACT

Examples are disclosed for providing flexible clear channel assessment (CCA) detection thresholds in a wireless local access network (WLAN). In some examples, an apparatus for dynamically setting a clear channel assessment (CCA) threshold in a wireless local area network (WLAN) may comprise a processor component, a radio coupled to the processor component, and logic for execution by the processor component to establish a CCA threshold for a wireless channel of the WLAN, send a first wireless message to one or more wireless station (STA) devices in wireless proximity to the apparatus informing the one or more STA devices of the established CCA threshold and instructing the one or more STA devices to avoid CCA levels exceeding the CCA threshold on the wireless channel and send a second wireless message to a wireless access point (AP) device associated with the apparatus informing the AP device of the established CCA threshold and instructing the AP device to broadcast use of the CCA threshold on the wireless channel. Other examples are described and claimed.

19 Claims, 11 Drawing Sheets

(51) Int. Cl.
*H04W 84/12* (2009.01)
*H04W 74/00* (2009.01)

(58) Field of Classification Search
USPC .......................................................... 370/389
See application file for complete search history.

(56) References Cited

U.S. PATENT DOCUMENTS

| | | |
|---|---|---|
| 2007/0060155 A1 | 3/2007 | Kahana et al. |
| 2007/0072638 A1 | 3/2007 | Yang et al. |
| 2007/0270102 A1 | 11/2007 | Zhu et al. |
| 2008/0267079 A1 | 10/2008 | Mhatre et al. |
| 2010/0067473 A1 | 3/2010 | Cave et al. |
| 2012/0230310 A1 | 9/2012 | Roy et al. |
| 2013/0017794 A1 | 1/2013 | Kloper et al. |
| 2016/0309357 A1* | 10/2016 | Wong ................ H04W 28/0236 |

OTHER PUBLICATIONS

Office Action received for Japanese Patent Application No. 2016-506308, dated Oct. 11, 2016, pages including 4 pages English translation.
Park, Minyoung, TGah SFD D13.x, IEEE 802.11-13/0354r0, IEEE, retrieved from <:https://mentor.ieee.org/802.11/dcn/13/11-13-0354-00-00ah-tgah-sfd-d13- x.docx>, Mar. 20, 2013, 7 pages.
Extended European Search Report received for European patent Application No. 13887800.4, dated Nov. 8, 2016, 8 pages.

* cited by examiner

400

```
ESTABLISH A CCA THRESHOLD FOR A WIRELESS
CHANNEL OF A WLAN
402
          │
          ▼
SEND A FIRST WIRELESS MESSAGE TO ONE OR MORE
WIRELESS STATION (STA) DEVICES IN WIRELESS
PROXIMITY TO THE APPARATUS INFORMING THE ONE OR
MORE STA DEVICES OF THE ESTABLISHED CCA
THRESHOLD AND INSTRUCTING THE ONE OR MORE STA
DEVICES TO AVOID CCA LEVELS EXCEEDING THE CCA
THRESHOLD ON THE WIRELESS CHANNEL
404
          │
          ▼
SEND A SECOND WIRELESS MESSAGE TO A WIRELESS
ACCESS POINT (AP) DEVICE ASSOCIATED WITH THE
APPARATUS INFORMING THE AP DEVICE OF THE
ESTABLISHED CCA THRESHOLD AND INSTRUCTING THE
AP DEVICE TO BROADCAST USE OF THE CCA
THRESHOLD ON THE WIRELESS CHANNEL
406
```

```
RECEIVING, AT A STATION (STA) DEVICE, A WIRELESS
MESSAGE FROM AN APPARATUS INDICATING USE OF AN
ESTABLISHED CCA THRESHOLD FOR A WIRELESS
CHANNEL OF A WLAN
442
```

```
WIRELESSLY COMMUNICATE USING THE WIRELESS
CHANNEL OF THE WLAN USING A CCA LEVEL LESS THAN
OR EQUAL TO THE CCA THRESHOLD
444
```

```
WIRELESSLY COMMUNICATE USING A DIFFERENT
WIRELESS CHANNEL OF THE WLAN OR A DIFFERENT
WLAN USING A CCA LEVEL EXCEEDING THE CCA
THRESHOLD
446
```

```
RECEIVE, AT AN ACCESS POINT (AP) DEVICE OF A WLAN,
A WIRELESS MESSAGE FORM AN APPARATUS INDICATING
USE OF AN ESTABLISHED CCA THRESHOLD FOR A
WIRELESS CHANNEL OF THE WLAN
482
```

```
ADVERTISE USE OF THE CCA THRESHOLD ON THE WLAN
TO ONE OR MORE OTHER AP DEVICES OR STATION (STA)
DEVICES IN WIRELESS PROXIMITY TO THE AP DEVICE
484
```

```
SET A BIT (E.G. A CCA INTOLERANT BIT) IN A FRAME (E.G.
A MANAGEMENT FRAME) TO INDICATE THAT A STATION
      CANNOT TOLERATE A HIGH CCA THRESHOLD
                        502
```

```
   TRANSMIT A MANAGEMENT FRAME WITH THE CCA
INTOLERANT BIT SET TO 1 AS A BROADCAST FRAME TO
 INFORM NEIGHBORING STATIONS THAT THE STATION
      CANNOT TOLERATE A HIGH CCA THRESHOLD
                        504
```

```
   TRANSMIT A MANAGEMENT FRAME WITH THE CCA
INTOLERANT BIT SET TO 1 AS A UNICAST FRAME TO THE
   ACCESS POINT ASSOCIATED WITH THE STATION
                        506
```

RECEIVE, AT AN ACCESS POINT, A MANAGEMENT FRAME WITH A CCA INTOLERANT BIT SET TO 1
542

SET THE CCA INTOLERANT BIT TO 1 IN AN INFORMATION ELEMENT (E.G. EXTENDED CAPABILITIES ELEMENT) IN A BEACON FRAME
544

- RECEIVE A MANAGEMENT FRAME WITH A CCA INTOLERANT BIT SET TO 1 AT A STATION
  582

- DETERMINE THAT THE STATION SHOULD NOT USE A HIGH CCA THRESHOLD
  584

- DETERMINE IF THE STATION HAS NOT RECEIVED ANY MANAGEMENT FRAME WITH THE CCA INTOLERANT BIT SET TO 1
  586

- IF NOT, USE A HIGH CCA LEVEL FOR MEDIUM ACCESS FOR THE STATION
  588

*FIG. 5C*

TECHNIQUES FOR PROVIDING FLEXIBLE CLEAR CHANNEL ASSESSMENT DETECTION THRESHOLDS IN A WIRELESS NETWORK

RELATED APPLICATIONS

This application claims the benefit of U.S. Provisional Application Ser. No. 61/819,903 filed May 6, 2013, entitled "TECHNIQUES FOR PROVIDING FLEXIBLE CLEAR CHANNEL ASSESSMENT DETECTION THRESHOLDS IN A WIRELESS NETWORK" which application is incorporated herein by reference in its entirety.

TECHNICAL FIELD

Examples described herein are generally related to techniques for providing flexible clear channel assessment (CCA) detection thresholds in a wireless network.

BACKGROUND

Carrier Sense (CS) is an integral part of many modern WLAN (e.g. WiFi) networks. Fundamentally, Wi-Fi is a multiple access link, which means that it is shared and requires vastly different protocol design and architecture than a point to point circuit. In addition, random access to the medium is distributed across all stations on the network. WiFi does not currently pass tokens, reserve the medium with bit-mappings, or use any other control mechanisms dictating which stations have access to transmit. This distributed nature makes carrier sense (and subsequent medium contention) core components of network operation and efficiency.

As networks and devices continue to evolve, different types of devices and networks may be required to coexist. For example, low power devices and networks (e.g. sensor devices, networks and the like) may coexist with high power devices and networks (e.g. cellular phones, networks and the like). In these situations, it may be important to manage clear channel assessment (CCA) detection thresholds to improve system efficiency and to prevent high power devices and networks from interfering with the performance and reliability of low power devices and networks. Other embodiments are described and claimed.

BRIEF DESCRIPTION OF THE DRAWINGS

FIG. 4A illustrates an example of a second logic flow.

FIG. 4B illustrates an example of a third logic flow.

FIG. 4C illustrates an example of a fourth logic flow.

FIG. 5A illustrates an example of a fifth logic flow.

FIG. 5B illustrates an example of a sixth logic flow.

FIG. 5C illustrates an example of a seventh logic flow.

DETAILED DESCRIPTION

Figure 1:
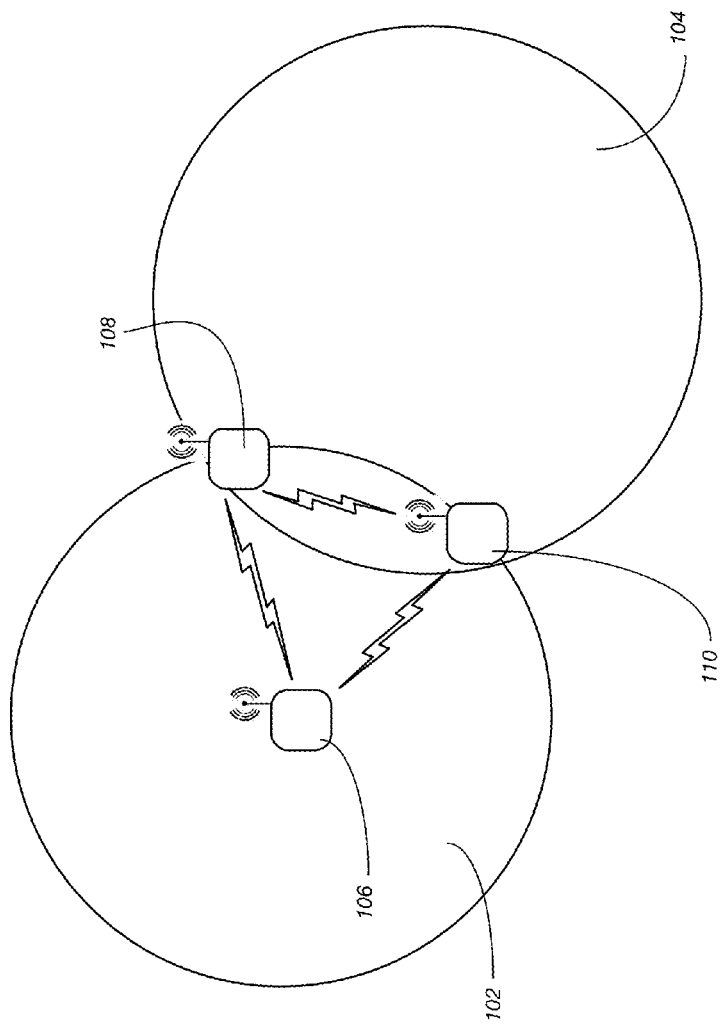
FIG. 1 illustrates an example of a wireless local access network.

Examples are generally directed to techniques for providing flexible CCA detection thresholds in wireless local access networks (WLANs). In some embodiments, the techniques, systems, devices and networks described herein may be included with or implemented by nodes and/or devices in WLANs that may be configured to operate in accordance with various wireless network standards. These wireless network standards may include standards promulgated by the Institute of Electrical Engineers (IEEE). These wireless network standards may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). In some embodiments, these wireless network standards may include standards (including progenies and variants) associated with the IEEE 802.11ah Standard. The examples are not limited in this context.

In some embodiments, use cases in WLAN networks can be very diverse. For example, a WLAN network can include both WiFi offloading and sensor networks in some embodiments. In various embodiments, this example use case may include low transmit power devices (e.g. sensor devices and the like) along with high transmit power devices (e.g. cellular phones and the like) that utilize a high data rate. In various embodiments, this varied use case creates an issue when the two types of devices/networks are in proximity to each other. For example, in a WLAN that operates at 900 MHz, devices with low CCA's can "hear" transmissions from far away due to the propagation at this band compared to the 2.4 and 5 GHz based (e.g., for the same transmit (Tx) Power). This coupled with the lower data rates introduced by sensor devices and networks more than offsets losses in frequency diversity of a 1/2/4 or 8 MHz bandwidth or also the antenna gain losses. Therefore, when a low power device is accessing a medium, the receiver may detect transmissions from devices that are farther away and therefore covering a much larger area. This can lead to an increased number of deferrals by a low power device, which could lower overall system throughput and restrict the deployment density of a WLAN.

Several options exist for setting and using a CCA level in a WLAN network. In some embodiments, CCA mechanisms may follow in the spirit of previous releases of the IEEE 802.11a/g/n/ac standards. Due to the traffic mix envisioned in IEEE 802.11ah standard networks, however, one option for minimizing the above-described negative effects is to de-sense the receiver to improve network efficiency for high data rate (high power) networks. In these embodiments, because 900 MHz band network signals can travel further than in 2.4 and 5 GHz networks, an increased number of potential deferrals may exist. This technique may improve operation for high power devices, but it does so by degrading a neighboring sensor network that requires a low CCA. Stated differently, this solution may severely degrade some use cases, specifically the case of a sensor network operating with lower transmit power in proximity to a high power network.

Another potential solution to remedying the above-described issues includes partitioning of the frequency band, whereby part of the channels would operate with dedicated high CCA, and the rest would use dedicated low CCA. One problem with this solution is that it severely limits the number of deployment options. For example, if an enterprise type deployment in an office building is being configured where it may be desirable to use the high CCA to maximize data throughput, it may not be possible to use all channels due to some channels being dedicated for low CCA even though these channels may not be used in this type of deployment. This solution requires forcing a fixed channel assignment to have a specific CCA threshold.

In view of the shortcomings of the above-recited solutions, it may be desirable in some embodiments for the CCA detection threshold to be dynamically set. In various embodiments, dynamically setting the CCA detection threshold may allow sensor networks to operate to their full capacity and allow high power networks to change channels if near a sensor network or to otherwise accept the low CCA threshold required by the sensor network. In some embodiments, this flexible solution may establish that the CCA threshold not be simply increased, or have it set based on channel number, but to dynamically set the CCA.

To enable the above-described flexible solution in some embodiments, a low power network (e.g. sensor network) where low power transmitters are used may be operative to broadcast an intolerant bit to indicate that it is using a low CCA setting in a management frame. This intolerant bit would inform its neighboring STA's/AP's of the low CCA being used by the sensor network and may restrict neighboring high power networks from using a higher CCA threshold. If a high CCA threshold is desired by a neighboring high power network, that network may utilize a different frequency if desired. Other embodiments are described and claimed.

In some embodiments this solution can be further expanded to set CCA dynamically based on several other system parameters that are trying to be optimized, such as MAC efficiency, or System Throughput in densely deployed networks. While described herein as targeting IEEE 802.11ah standard based networks for purposes of illustrations, it should be understood that the concepts and techniques described herein can be used in any WLAN network in which CCA setting is dynamically set to afford dense deployments. In some embodiments, for example, the embodiments described herein may apply to High-Efficiency WiFi (HEW) systems. The embodiments are not limited in this context.

FIG. 1 illustrates an example wireless local access network (WLAN) 100. In some examples, as shown in FIG. 1, WLAN 100 includes cells/networks 102 and 104. Also, as shown in FIG. 1, WLAN includes nodes/devices 106, 108 and 110 coupled via communication links (not shown). In various embodiments the cell 102 may comprise a sensor/low power network and the cell 104 may comprise a cellular/high power network. The node 106 may comprise an access point (AP) for the low power network, the node 108 may comprise a cell phone or other high power device and the node 110 may comprise a low power device such as a sensor device. The embodiments are not limited to the number, type or arrangement of elements or components shown in FIG. 1. The terms node and device are used interchangeably herein.

While not shown in FIG. 1, one or more of the devices 106, 108 and/or 110 may include one or more of a processor, memory coupled to the processor component, a radio coupled to the processor component, one or more antennas coupled to the radio, and logic for execution by the processor component to perform one or more of the operations described herein.

In various embodiments, one or more of the devices 106, 108 and/or 110 may be operative to communicate content, data, information and/or signals over a wireless communication channel, for example, a radio channel, an IR channel, a RF channel, a Wireless Fidelity (WiFi) channel, and the like. One or more elements of system 100 may optionally also/alternatively be capable of communicating over any suitable wired communication link. While not limited in this respect, in some embodiments described herein one or more of the devices 106, 108 and/or 110 may comprise a user equipment (UE) device, a station (STA) device and/or an access point (AP) device in a WiFi network. Although the wireless devices 106, 108 and 110 shown in FIG. 1 have a limited number of elements in a certain topology or configuration, it may be appreciated that the wireless devices 106, 108 and 110 may include more or less elements in alternate configurations as desired for a given implementation. For example, the device shown and described with reference to FIG. 7 may comprise an example architecture for one or more of the devices 106, 108 and/or 110. Other embodiments are described and claimed.

In various embodiments, one or more of the devices 106, 108 and/or 110 may include or may be implemented as part of a wireless, mobile or portable device. For example, one or more of the devices 106, 108 and/or 110 may include or may be implemented as part a mobile computer, a laptop computer, a notebook computer, a smartphone, a UE device, a STA device, an AP device, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

One or more of devices 106, 108 and/or 110 may include, for example, one or more processor components, memory and wireless transceivers. One or more of devices 106, 108 and/or 110 may optionally include other suitable hardware components and/or software components and are not limited to the number, type or arrangement of components shown in FIG. 1 or described elsewhere herein. Moreover, while shown in FIG. 1 as having the same components, it should be understood that devices 106, 108 and 110 may include different components, arrangement of components, etc. from one another and still fall within the described embodiments. In some embodiments, some or all of the components of one or more of devices 106, 108 and 110 may be enclosed in a common housing or packaging, and may be interconnected or operably associated using one or more wired or wireless links. In other embodiments, components of one or more of devices 106, 108 and 110 may be distributed among multiple or separate devices.

As described herein, a processor components may comprise, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. A processor components may be operative to execute instructions, for example, of an Operating System (OS) of a devices 106, 108, 110, one or more suitable applications, and/or logic.

A processor components may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor components. According to some examples processor components may also be application specific integrated circuits (ASIC) and other components of devices 106, 108, 110 may be implemented as hardware elements of the ASIC. Processor components may be a single processing unit or a number of processing units, all of which may include single or multiple computing units or multiple cores. The processor components may be implemented as one or more microprocessors, microcomputers, microcontrollers, digital signal processors, central processing units, state machines, logic circuitries, and/or any devices that manipulate signals based on operational instructions. Among other capabilities, the processor components may be configured to fetch and execute computer-readable instructions or processor-accessible instructions stored in a memory or other computer-readable storage media.

While not shown in FIG. 1, wireless devices 106, 108 and/or 110 may include input/out units that may include, for example, a keyboard, a keypad, a mouse, a touch-pad, a track-ball, a stylus, a microphone, or other suitable pointing device or input device, a monitor, a screen, a flat panel display, a Cathode Ray Tube (CRT) display unit, a Liquid Crystal Display (LCD) display unit, a plasma display unit, a touch sensitive display, one or more audio speakers or earphones, or other suitable output devices. The embodiments are not limited in this respect.

In various embodiments, memory may comprise a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. A storage unit includes, for example, a hard disk drive, a floppy disk drive, a Compact Disk (CD) drive, a CD-ROM drive, a DVD drive, or other suitable removable or non-removable storage units. As shown in FIG. 1, Memory may store, among other things, OS, applications, data and/or logic, one or more of which may be executed by processor components and/or otherwise processed by wireless devices 106, 108 and/or 110 in some embodiments.

Memory may comprise a non-transitory computer-readable storage media for storing instructions to be executed by processor components to perform the various functions described herein. For example, memory may generally include both volatile memory and non-volatile memory (e.g., RAM, ROM, or the like). Memory may be referred to as memory or computer-readable storage media herein.

Memory is capable of storing computer-readable, processor-executable program instructions as computer program code that may be executed by processor components as a particular machine configured for carrying out the operations and functions described in the implementations herein.

Memory may include one or more operating systems, and may store one or more applications. The operating systems may be one of various known and future operating systems implemented for personal computers, audio video devices, mobile devices, smartphones, tablets and the like. The applications may include preconfigured/installed and downloadable applications. In addition, memory may include data to store the installed and downloaded applications. The embodiments are not limited in this respect.

According to some examples, devices 106, 108 and 110 may be part of wireless devices such as a sensor device, a smartphone and an access point, for example, that may be capable of operating in compliance with one or more wireless technologies or standards such as WLAN and/or Wi-Fi wireless technologies. For example, the devices 106, 108 and 110 may be arranged or configured to wirelessly couple with or communicate with one another via communication channel and/or medium. The embodiments are not limited in this context.

Devices 106, 108 and 110 may include wireless transceivers in some embodiments. In various embodiments, wireless transceivers may include radios and antennas. In an implementation, the radios and antennas may be used to establish a wireless connection with, for example, the other respective devices 106, 108 and 110 or another wireless device (not shown in FIG. 1). Antennas may comprise or include any type of antennas suitable for transmitting and/or receiving wireless communication signals, blocks, frames, transmission streams, packets, messages and/or data, e.g., over channel 106. For example, antennas may include any suitable configuration, structure and/or arrangement of one or more antenna elements, components, units, assemblies and/or arrays. Antennas may include an antenna covered by a quasi-omni antenna pattern. For example, antennas may include at least one of a phased array antenna, a single element antenna, a set of switched beam antennas, and the like. In some embodiments, antennas may implement transmit and receive functionalities using separate transmit and receive antenna elements. In some embodiments, antennas may implement transmit and receive functionalities using common and/or integrated transmit/receive elements. The embodiments are not limited in this respect.

The example devices 106, 108 and 110 described herein are merely examples that are suitable for some implementations and are not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, a computer program product may implement the processes and components described herein.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In some examples, WLAN 100 may be capable of operating in compliance with at least one or more wireless communication standards or specifications associated with IEEE 802.11 standards. Also, for these examples, the nodes depicted in FIG. 1 may be capable of using carrier sense multiple access (CSMA) to reduce transmission collisions when transmitting packets. According to some examples, node 106 may be an access point (AP) node for cell 102 and node 110 may be a terminal node that may transmit packets to AP 106 via a communication link. Node 108 may be a terminal node for an AP (not shown) for cell 104. Other embodiments are decried and claimed.

The need for two CCA levels is illustrated in the embodiments shown in FIG. 1. In FIG. 1 it is assumed, for purposes of illustration and not limitation, that the nodes 106, 108 and 110 form an equilateral triangle in terms of path loss. Using a −98 dBm CCA level in a 1 MHz bandwidth in FIG. 1 one can assume that the sensor device's 110 signal is received at a level of −98 dBm by both the cell phone device 108 and the AP 106. If the cellular, high power device 108 (e.g. 16 dBm transmit (Tx) power, for example) does not defer at the −98 dBm as specified in the 1 MHz band that is overlapping, then the sensors device 110 transmission will be swamped by the interference from the cellular high power device 108. For example the high power device 108 may be transmitting at 4 MHz at 16 dBm, resulting in interference that would be at −92 dBm at the sensor's AP 102 in the 1 MHz band. This example may be even worse if the high power device 108 is operating in 1 or 2 MHz.

Figure 2:
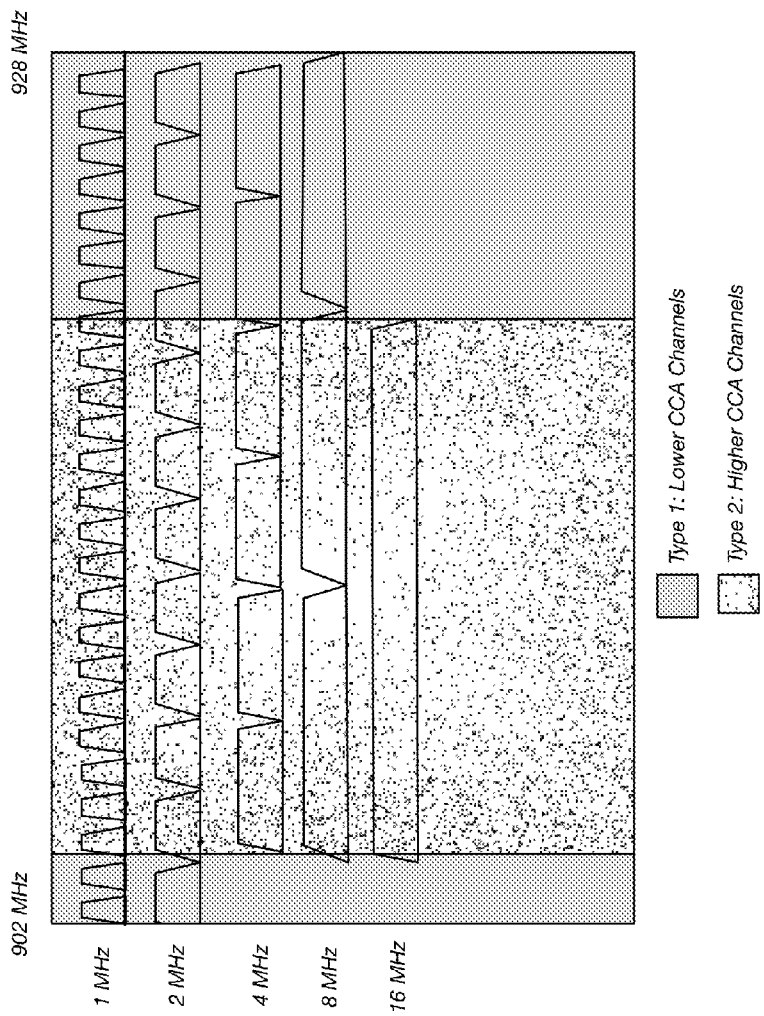
FIG. 2 illustrates an example of a channel assignment diagram.

Based at least on the foregoing, it may be advantageous to have two CCA levels to allow for different deployment situations. As shown in FIG. 2, this may result from splitting the spectrum into two types of channels, one having a higher CCA threshold to allow preference to the higher bandwidth, higher power cellular offload use-case (e.g. Type 2 in FIG. 2), and the other having a lower CCA threshold for protecting the low power low bandwidth sensor networks (e.g. Type 1 in FIG. 2). In various embodiments, this approach may be applied only in geographical regions where a wide spectrum is available for IEEE 802.11ah operation and not globally. Additionally, this approach may severely limit the deployment possibilities as mentioned above. In situations like enterprise, or areas with all devices using a similar use-case, the total allowed spectrum is reduced for use. Having these assignments fixed does not afford deployment flexibility. The approach to improve this and allow the different use cases to exist thus improving overall system throughput and good-put, is to have the CCA dynamically assigned as set forth herein.

In various embodiments, there are at least two possibilities for applying a dynamic CCA assignment solution. A first embodiment may comprise using a set of rules whereby the channels are negotiated based on whether a low power sensor network is using a particular channel. In other embodiments a solution may comprise adopting a frequency plan like that shown in FIG. 2, but establishing rules whereby the CCA allocations based on channel number/frequency are not mandatory. Instead the device uses one of the predefined channels based on the desired CCA usage as a primary channel. If none of the primary channels are available that matches the desired CCA use case, it can use any other channel and the rules outlined below apply. While the embodiments are not limited in this respect, the first of these two possibilities is described herein for purposes of illustration and not limitation.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

In various embodiments, the above-described rules for providing flexible/dynamic CCA detection thresholds are illustrated in FIGS. 3, 4A-4C and 5A-5C which illustrate example logic flows. As shown in FIGS. 3, 4A-4C and 5A-5C, the logic flows include logic flows 300, 400, 440, 480, 500, 540 and 580. Logic flows 300, 400, 440, 480, 500, 540 and 580 may be representative of some or all of the operations executed by one or more logic, features, or devices described herein.

Figure 3:
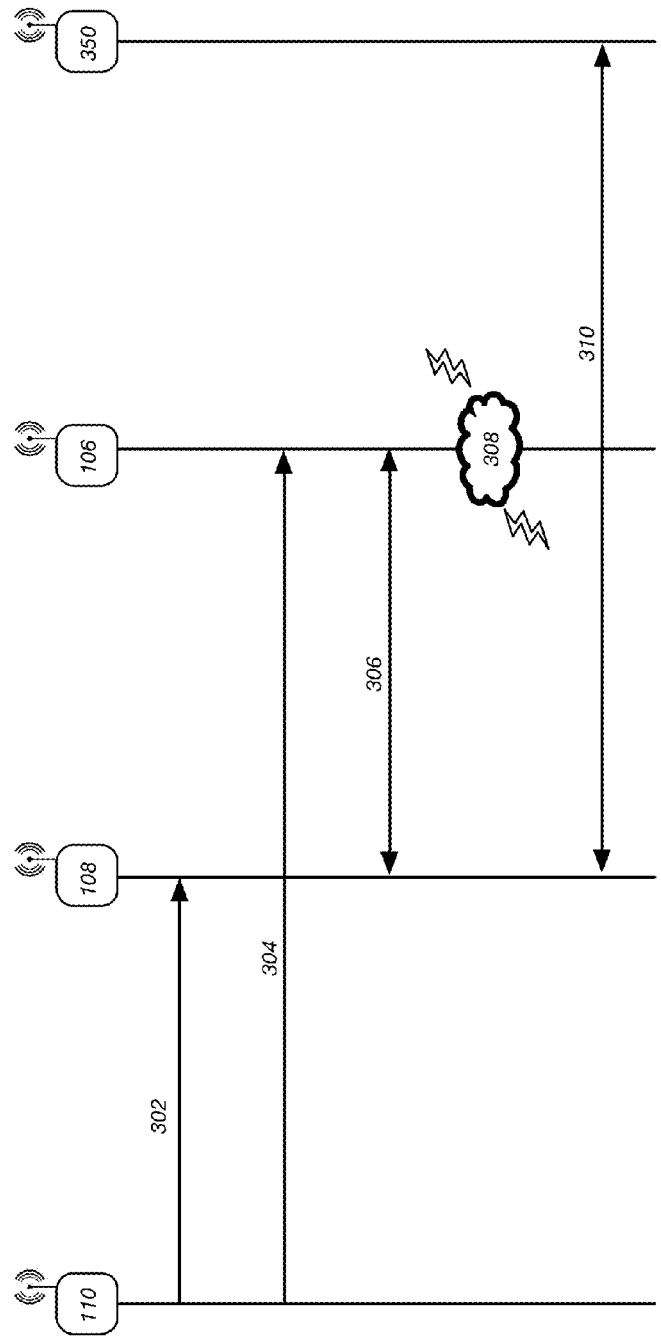
FIG. 3 illustrates an example of a first logic flow.

FIG. 3 illustrates a logic flow 300. In various embodiments, the logic flow 300 may comprise a signal diagram representing one embodiment of the signals exchanged between devices 106, 108 and 110, which may be the same or similar to the devices 106, 108 and 110 of FIG. 1, for dynamically setting a clear channel assessment (CCA) threshold in a wireless local area network (WLAN). In some embodiments, the signals may comprise wireless signals exchanged via one or more channels of a WLAN comprising a wireless fidelity (WiFi) network or a high efficiency WiFi (HEW) network. In various embodiments, device/apparatus 110 may comprise a low power device or a sensor device and STA device 108 may comprise a high power device. As used herein, the terms low power and high power may refer to power and/or transmission levels associated with a wireless device. The terms low power and high power may be dynamic and may changed based on any number of factors including but not limited to system configuration.

In various embodiments, low power and high power levels may be determined based on a CCA threshold or may be selected based on a comparison with a CCA threshold. Device 110 may establish a CCA threshold for a wireless channel of the WLAN based on one or more attributes of the device 110. For example, the one or more attributes may comprise one or more of transmission power, antenna configuration, frequency of operation, modulation technique, physical deployment, based on location of devices in a densely deployed network, which could be physical location based on distance, or measured signal level. In some embodiments, a low power device may comprise a device configured to operate using a CCA level less than or equal to the CCA threshold and a high power device may comprise a device configured to operate using a CCA level greater than or equal to the CCA threshold. In various embodiments, it should be noted that a determination of low power versus high power may not be necessary as a system or network could include all one type of device communicating with different AP's but are densely deployed so it may be desirable to reuse the channel. These types of devices may interfere with each other, but some interference may be okay and may be mitigated by a smart receiver. In these embodiments, the AP may set the AP based on traffic and interference it is hearing or that the station devices are reporting that they are seeing. The embodiments are not limited in this respect.

In some embodiments, device 110 may send a first wireless message 302 to one or more wireless station (STA) devices 108 in wireless proximity to the device 110. The one or more STA devices 108 may comprise devices associated with a same or a different WLAN than the device 110. This first wireless message 302 may comprise a broadcast message and may be used to inform the one or more STA devices 108 of the established CCA threshold required for operation in proximity to or using a same channel of a WLAN as device 110. For example, device 110 may comprise a low power sensor device that cannot tolerate a high CCA level. As a result, device 110 may notify device 108 (and other similar devices) that a CCA threshold has been established that can be tolerated (e.g. selected allow for normal operation) by device 110 and that any other devices wishing to communicate using the same channel cannot use a CCA level greater than the CCA threshold. Stated differently, the first wireless message 302 may instruct the one or more STA devices 108 to avoid CCA levels exceeding the CCA threshold on the wireless channel. In various embodiments, the first wireless message 302 may comprise a management frame in which a CCA intolerant bit has been set (e.g. to 1) to indicate that the device 110 cannot tolerate a CCA level above the CCA threshold. This message 302 may be broadcast to the one or more STA devices 108.

Based on receipt of the first wireless message 302, device 108 can choose to abide by the established CCA threshold and communicate on the same channel of the WLAN as device 110 (e.g. as shown at 306), or device 108 can chose to communicate using a different channel and/or different WLAN that may not be encumbered by a CCA threshold (e.g. as shown at 310). For example, rather than complying with the low CCA threshold established by device 110, device 108 may choose to establish a wireless connection 310 with a different AP/WLAN 350. The embodiments are not limited in this respect.

The device 110 may send a second wireless message 304 to a wireless access point (AP) device 106 associated with the device 110 in some embodiments. For example, the AP device 106 may comprise an AP serving a WLAN with which device 110 is connected. The second wireless message 304 may comprise a unicast message to the AP 106 to inform the AP device 106 of the established CCA threshold and instruct the AP device to broadcast use of the CCA threshold on the wireless channel as shown at 308 (e.g. in a beacon frame, for example). For example, the AP device 106 may inform other AP devices and/or other STA devices 108 (and the like) in wireless proximity to the AP device of the established CCA threshold. In some embodiments, the second wireless message may comprise a management frame having a CCA intolerant bit set (e.g. to 1) in an information element (e.g. Extended Capabilities element) to indicate that the apparatus cannot tolerate a CCA level above the CCA threshold and to unicast the management frame to the AP device. Other embodiments are described and claimed.

Based on the exchange of signals shown in FIG. 3, low power device 110 may be operative to establish a CCA threshold that will allow device 110 to operate normally without undue interference for high power devices (e.g. device 108) in proximity to device 110. The embodiments are not limited in this respect.

FIG. 4A illustrates a logic flow 400. In various embodiments, the logic flow 400 may represent logic for dynamically setting a clear channel assessment (CCA) threshold in a wireless local area network (WLAN) from the perspective of a low power/sensor device, such as device 110. In various embodiments, at 402 the logic flow may include establishing a CCA threshold for an apparatus associated with the WLAN. For example, device 110 may comprise a low power device and, as such, may set a CCA threshold to enable effective operation as part of the WLAN. At 404 the logic flow may include sending a first wireless message from the apparatus to one or more wireless station (STA) devices informing the one or more STA devices of the established CCA threshold and instructing the one or more STA devices to avoid CCA levels exceeding the CCA threshold on the wireless channel. For example, device 110 may set a CCA intolerant bit in a management frame to indicate that the apparatus cannot tolerate a CCA level above the CCA threshold and may broadcast the management frame to the one or more STA devices (e.g. device 108 and the like).

In various embodiments, the logic flow at 406 may comprise sending a second wireless message from the apparatus to a wireless access point (AP) device associated with apparatus informing the AP device of the established CCA threshold and instructing the AP device to broadcast use of the CCA threshold on the wireless channel. For example, device 110 may set a CCA intolerant bit in a management frame to indicate that the apparatus cannot tolerate a CCA level above the CCA threshold and may unicast the management frame to the AP device 106. Other embodiments are described and claimed.

FIG. 4B illustrates a logic flow 440. In various embodiments, the logic flow 440 may represent logic joining a wireless local area network (WLAN) having an established clear channel assessment (CCA) threshold from, for example, the perspective of a STA device such as device 108. In various embodiments, the logic flow at 442 may comprise receiving, at a station (STA) device, a wireless message from an apparatus indicating use of an established CCA threshold for a wireless channel of the WLAN. For example, the wireless message may comprise a management frame comprising a CCA intolerant bit set to indicate use of the CCA threshold, received at device 108 from device 110.

At 444, the logic flow may comprise wirelessly communicating using the wireless channel of the WLAN using a CCA level less than or equal to the CCA threshold in some embodiments. For example, device 108 can choose to communicate on the same channel as device 110 if the device 108 agrees to abide by the established CCA threshold. In other embodiments, at 446 the logic flow may comprise wirelessly communicating using a different wireless channel of the WLAN or a different WLAN using a CCA level exceeding the CCA threshold. For example, device 108 may chose to ignore the CCA threshold established by device 110 and may, instead, communicate using a different channel of the WLAN or may join a different WLAN. The embodiments are not limited in this respect.

FIG. 4C illustrates a logic flow 480. In various embodiments, the logic flow 480 may represent logic for managing a wireless local area network (WLAN) having an established clear channel assessment (CCA) from the perspective of an AP device such as device 106. In various embodiments, the logic flow at 482 may comprise receiving, at an access point (AP) device of the WLAN, a wireless message from an apparatus indicating use of an established CCA threshold for a wireless channel of the WLAN. For example, the wireless message may comprise a management frame comprising a CCA intolerant bit set to indicate use of the CCA threshold received at AP 106 from device 110. In some embodiments, the logic flow at 444 may comprise advertising use of the CCA threshold on the WLAN to one or more of other AP devices or station (STA) devices in wireless proximity to the AP device. For example, AP 106 may broadcast a beacon frame indicating use of the CCA threshold on the particular channel of the WLAN. Other embodiments are described and claimed.

As shown in logic flow 500 of FIG. 5A, at 502 a STA may set a bit (e.g. CCA intolerant bit) in a frame (e.g. a management frame) to indicate that the STA cannot tolerate the high CCA threshold. For example, a sensor device (node or AP) 110 may set the intolerant bit to 1 to indicate that a low CCA threshold is required. At 504, the STA may transmit a management frame with the CCA intolerant bit set to 1 as a broadcast frame to inform its neighboring STAs. For example, the sensor device (e.g. device 110) may broadcast the management frame with the CCA intolerant bit set to 1 to other devices in the vicinity, including high power device (e.g. cell phones) that may wish to use a high CCA threshold (e.g. device 108). At 506, the STA may transmit a management frame with the CCA intolerant bit set to 1 as a unicast frame to the AP to which it is associated. For example, device 110 may send the management frame with the intolerant bit set to 1 to AP 106.

FIG. 5B illustrates a logic flow 520. In various embodiments, at 542, when the AP receives the management frame with the CCA intolerant bit set to 1, the AP shall set the CCA intolerant bit to 1 in an information element (e.g. Extended Capabilities element) in a beacon frame at 544. For example, AP 106 may receive the management frame with the CCA intolerant bit set to 1 and may set the CCA intolerant bit to 1 in an information element in a beacon frame sent to one or more of devices 108 and 110.

As shown in logic flow 580 of FIG. 5C, at 582, a STA that receives a management frame with the CCA intolerant bit set to 1 shall not use the high CCA threshold 584. If a STA has not received any management frame with the CCA intolerant bit set to 1 at 586, the STA may use the high CCA level for medium access at 588. For example, if the node 110 does not send out a management frame with a CCA intolerant bit set to 1, high power device 108 may be operative to use a high CCA threshold. Other embodiments are described and claimed.

The above-described embodiments may allow any sensor STA/AP using a particular channel to allow neighboring networks to coexist, but they would have to adopt the lower CCA level. For example, the high power device 108 may be required to adopt the lower CCA level used by sensor devices 106 and 110. This indication allows the high power device for cellular offloading to either choose to stay on this channel or reconfigure to another frequency where they can use the higher CCA level.

In various embodiments, this concept can be expanded to future generations of Wi-Fi to afford higher density deployments. Instead of being two CCA levels, the levels can be dynamically set based on the network configuration and various system metrics to optimize large network deployment throughput. For example a larger deployment could consist of, for example, three different types of use cases. For example, one is a sensor network, one is a small cell network and the other a larger cell network. Assume the large cell network overlaps completely with the sensor and partially with the small cell. In these embodiments, an assumption for explanation will be that the three networks require different CCA levels to optimize performance. Here, the sensor CCA needs a low CCA to communicate due to its restricted Tx power. The other two networks do not have that restriction. Then the small cell needs a high CCA network so it doesn't hear communications from a far distance so that it can increase throughput in its network. Finally, the larger cell, which partially overlaps has a few choices, it can share channels with the small cell or sensor network, or choose its own channel. For explanation, we focus on just adjusting the CCA for the large cell. It has the option to optimize its CCA level based on the other networks in attempt to use all channels and increase total system throughput.

While now shown, various embodiments described herein may include an apparatus that may include a computer and/or firmware implemented apparatus having circuitry arranged to execute one or more components. According to some examples, the apparatus may be included in a source node in a WLAN. The source node and the WLAN may be capable of operating in compliance with one or more wireless technologies such as those described in or associated with the IEEE 802.11 standards. For example, the source node having the apparatus may be arranged or configured to wirelessly couple to other nodes such as AP nodes in a WLAN operated in compliance with one or more IEEE 802.11 standards. The examples are not limited in this context.

In some examples, the apparatus includes circuitry. Circuitry may be generally arranged to execute one or more components. Circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry. According to some examples circuitry may also be an application specific integrated circuit (ASIC) and components may be implemented as hardware elements of the ASIC.

According to some examples, the apparatus may include a transmit component. Circuitry may execute transmit component to transmit one or more packets to a destination node in a WLAN. In some examples, the apparatus may also include a receive component. Circuitry may execute receive component for receiving and decoding one or more packets.

Figure 6:
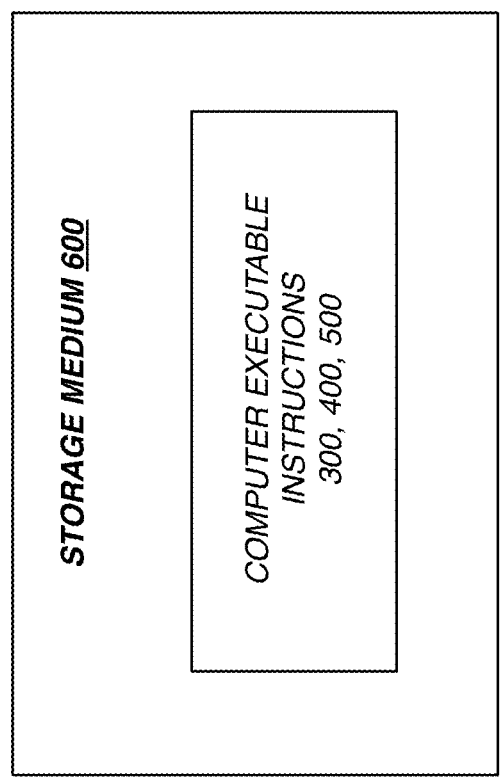
FIG. 6 illustrates an example of a storage medium.

FIG. 6 illustrates an embodiment of a first storage medium. As shown in FIG. 6, the first storage medium includes a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement any of logic flows 300, 400, 440, 480, 500, 540 and/or 580. Examples of a computer readable or machine readable storage medium may include any tangible media capable of storing electronic data, including volatile memory or non-volatile memory, removable or non-removable memory, erasable or nonerasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
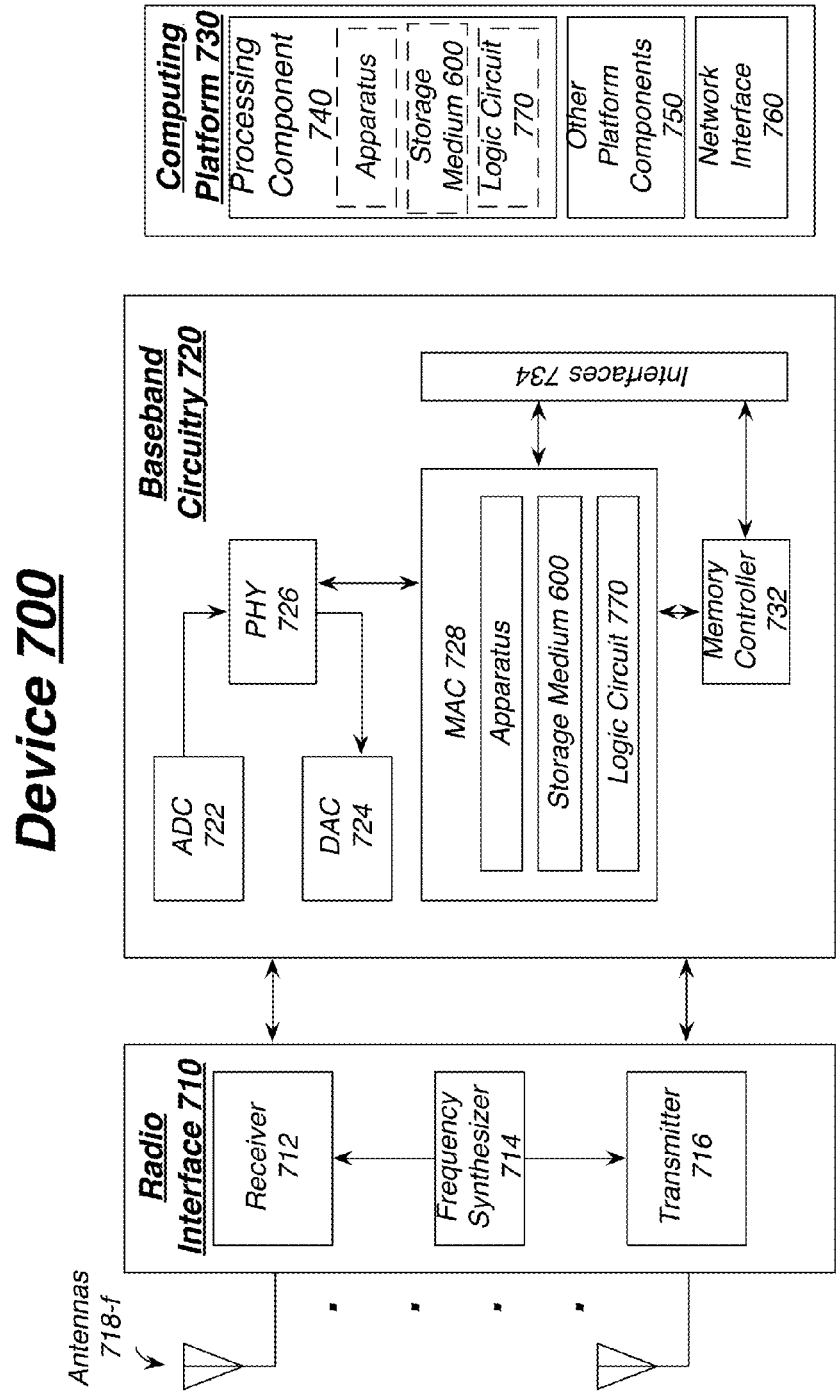
FIG. 7 illustrates an example of a device.

FIG. 7 illustrates an embodiment of a device 700. In some examples, device 700 may be configured or arranged for wireless communications in a wireless network such as a WLAN. Device 700 may implement, for example, an apparatus, storage medium, circuitry, logic or any other embodiments described herein. The logic circuit 770 may include physical circuits to perform operations described for an apparatus. As shown in FIG. 7, device 700 may include a radio interface 710, baseband circuitry 720, and computing platform 730, although examples are not limited to this configuration.

The device 700 may implement some or all of the structure and/or operations for an apparatus, storage medium 600 and/or a logic circuit in a single computing entity, such as entirely within a single device. The embodiments are not limited in this context.

Radio interface 710 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 710 may include, for example, a receiver 712, a transmitter 716 and/or a frequency synthesizer 714. Radio interface 710 may include bias controls, a crystal oscillator and/or one or more antennas 718-$f$. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a processing circuit 728 for medium access control (MAC)/data link layer processing. Baseband circuitry 720 may include a memory controller 732 for communicating with MAC processing circuit 728 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames (e.g., containing subframes). Alternatively or in addition, MAC processing circuit 728 may share processing for certain of these functions or perform these processes independent of PHY processing circuit 726. In some embodiments, MAC and PHY processing may be integrated into a single circuit.

Computing platform 730 may provide computing functionality for device 700. As shown, computing platform 730 may include a processing component 740. In addition to, or alternatively of, baseband circuitry 720 of device 700 may execute processing operations or logic for an apparatus, storage medium 600, and a logic circuit using the processing component 730. Processing component 740 (and/or PHY 726 and/or MAC 728) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 730 may further include a network interface 760. In some examples, network interface 760 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 700 may be part of a source or destination node in a WLAN and may be include in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 700 described herein, may be included or omitted in various embodiments of device 700, as suitably desired. In some embodiments, device 700 may be configured to be compatible with protocols and frequencies associated with IEEE 802.11 Standards or Specification for WLANs, although the examples are not limited in this respect.

Embodiments of device 700 may be implemented using single input single output (SISO) architectures. However, certain implementations may include multiple antennas (e.g., antennas 718-*f*) for transmission and/or reception using adaptive antenna techniques for beamforming or spatial division multiple access (SDMA) and/or using multiple input multiple output (MIMO) communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to further embodiments.

In one example, an apparatus for dynamically setting a clear channel assessment (CCA) threshold in a wireless local area network (WLAN) may comprise a processor component, a radio coupled to the processor component, and logic for execution by the processor component to establish a CCA threshold for a wireless channel of the WLAN, send a first wireless message to one or more wireless station (STA) devices in wireless proximity to the apparatus informing the one or more STA devices of the established CCA threshold and instructing the one or more STA devices to avoid CCA levels exceeding the CCA threshold on the wireless channel and send a second wireless message to a wireless access point (AP) device associated with the apparatus informing the AP device of the established CCA threshold and instructing the AP device to broadcast use of the CCA threshold on the wireless channel.

In another example of an apparatus, the logic may set a CCA intolerant bit in a management frame to indicate that the apparatus cannot tolerate a CCA level above the CCA threshold and broadcast the management frame to the one or more STA devices.

In another example of an apparatus, the logic may set a CCA intolerant bit in a management frame to indicate that the apparatus cannot tolerate a CCA level above the CCA threshold and to unicast the management frame to the AP device.

In another example of an apparatus, the logic may establish the CCA threshold based on one or more attributes of the apparatus.

In another example of an apparatus, the one or more attributes may comprise one or more of transmission power, antenna configuration, frequency of operation or modulation technique.

In another example of an apparatus, the apparatus may comprise one or more of a low power device or a sensor device and one or more of the wireless STA devices comprising a high power device.

In another example of an apparatus, the logic may broadcast the first wireless message to one or more STA devices associated with a different WLAN than the apparatus.

In another example of an apparatus, the WLAN comprising a wireless fidelity (WiFi) network or a high efficiency WiFi (HEW) network.

In one example, a method for dynamically setting a clear channel assessment (CCA) threshold in a wireless local area network (WLAN) may comprise establishing a CCA threshold for an apparatus associated with the WLAN, sending a first wireless message from the apparatus to one or more wireless station (STA) devices informing the one or more STA devices of the established CCA threshold and instructing the one or more STA devices to avoid CCA levels exceeding the CCA threshold on the wireless channel, and sending a second wireless message from the apparatus to a wireless access point (AP) device associated with apparatus informing the AP device of the established CCA threshold and instructing the AP device to broadcast use of the CCA threshold on the wireless channel.

In another example, a method may comprise setting a CCA intolerant bit in a management frame to indicate that the apparatus cannot tolerate a CCA level above the CCA threshold and broadcasting the management frame to the one or more STA devices.

In another example, a method may comprise setting a CCA intolerant bit in a management frame to indicate that the apparatus cannot tolerate a CCA level above the CCA threshold and to unicast the management frame to the AP device.

In another example, a method may comprise establishing the CCA threshold based on one or more attributes of the apparatus, the one or more attributes comprising one or more of transmission power, antenna configuration, frequency of operation or modulation technique.

In another example of a method, the apparatus comprising one or more of a low power device or a sensor device and one or more of the wireless STA devices comprising a high power device.

In another example, a method may comprise broadcasting the first wireless message to one or more STA devices associated with a different WLAN than the apparatus.

In another example, an apparatus may comprise means for performing the method of any of any of the examples described herein.

In another example, at least one machine-readable medium may comprise a plurality of instructions that in response to being executed on a computing device cause the computing device to carry out a method according to any of any examples described herein.

In another example, a wireless communications device may be arranged to perform the method of any of the examples described herein.

In one example, a system for dynamically setting a clear channel assessment (CCA) threshold in a wireless local area network (WLAN) may comprise a processor component, memory coupled to the processor component, a radio coupled to the processor component, one or more antennas coupled to the radio, and logic for execution by the processor component to establish a CCA threshold for a wireless channel of the WLAN, send a first wireless message to one or more wireless station (STA) devices in wireless proximity to the apparatus informing the one or more STA devices of the established CCA threshold and instructing the one or more STA devices to avoid CCA levels exceeding the CCA threshold on the wireless channel and send a second wireless message to a wireless access point (AP) device associated with the apparatus informing the AP device of the established CCA threshold and instructing the AP device to broadcast use of the CCA threshold on the wireless channel.

In another example of a system, the logic may set a CCA intolerant bit in a management frame to indicate that the system cannot tolerate a CCA level above the CCA threshold and broadcast the management frame to the one or more STA devices.

In another example of a system, the logic may set a CCA intolerant bit in a management frame to indicate that the system cannot tolerate a CCA level above the CCA threshold and to unicast the management frame to the AP device.

In another example of a system, the logic may establish the CCA threshold based on one or more attributes of the system, the one or more attributes comprising one or more of transmission power, antenna configuration, frequency of operation or modulation technique.

In another example of a system, the system may comprise one or more of a low power device or a sensor device and one or more of the wireless STA devices comprising a high power device.

In another example of a system, the logic may broadcast the first wireless message to one or more STA devices associated with a different WLAN than the system.

In another example of a system, the WLAN may comprise a wireless fidelity (WiFi) network or a high efficiency WiFi (HEW) network.

In one example, a method for joining a wireless local area network (WLAN) having an established clear channel assessment (CCA) threshold may comprise receiving, at a station (STA) device, a wireless message from an apparatus indicating use of an established CCA threshold for a wireless channel of the WLAN, wirelessly communicating using the wireless channel of the WLAN using a CCA level less than or equal to the CCA threshold, or wirelessly communicating using a different wireless channel of the WLAN or a different WLAN using a CCA level exceeding the CCA threshold.

In another example of a method, the wireless message comprising a management frame comprising a CCA intolerant bit set to indicate use of the CCA threshold.

In one example, a method for managing a wireless local area network (WLAN) having an established clear channel assessment (CCA) threshold may comprise receiving, at an access point (AP) device of the WLAN, a wireless message from an apparatus indicating use of an established CCA threshold for a wireless channel of the WLAN, and advertising use of the CCA threshold on the WLAN to one or more of other AP devices or station (STA) devices in wireless proximity to the AP device.

In another example of a method, the wireless message comprising a management frame comprising a CCA intolerant bit set to indicate use of the CCA threshold.

The foregoing examples and embodiments are set forth for purposes of illustration and not limitation. As such, other embodiments are described and claimed.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

What is claimed is:

1. An apparatus for dynamically setting a clear channel assessment (CCA) threshold in a wireless local area network (WLAN), comprising:
 a processor component;
 a radio coupled to the processor component; and
 logic for execution by the processor component to establish a CCA threshold for a wireless channel of the WLAN, the logic to:
  set a CCA intolerant bit in a management frame to indicate that the apparatus cannot tolerate a CCA level above the CCA threshold,
  send a first wireless message comprising an instance of the management frame to one or more wireless station (STA) devices in wireless proximity to the apparatus informing the one or more STA devices of the CCA threshold and instructing the one or more STA devices to avoid CCA levels exceeding the CCA threshold on the wireless channel, and
  send a second wireless message comprising another instance of the management frame to a wireless access point (AP) device associated with the apparatus informing the AP device of the CCA threshold and instructing the AP device to broadcast use of the CCA threshold on the wireless channel.

2. The apparatus of claim 1, the logic to broadcast the first wireless message comprising the instance of the management frame to the one or more STA devices.

3. The apparatus of claim 1, the logic to unicast the second wireless message comprising the other instance of the management frame to the AP device.

4. The apparatus of claim 1, the logic to establish the CCA threshold based on one or more attributes of the apparatus.

5. The apparatus of claim 4, the one or more attributes comprising one or more of transmission power, antenna configuration, frequency of operation or modulation technique.

6. The apparatus of claim 1, the apparatus comprising one or more of a low power device or a sensor device and one or more of the wireless STA devices comprising a high power device.

7. The apparatus of claim 1, the logic to broadcast the first wireless message to one or more STA devices associated with a different WLAN than the apparatus.

8. A method for dynamically setting a clear channel assessment (CCA) threshold in a wireless local area network (WLAN), comprising:
establishing a CCA threshold for an apparatus associated with the WLAN;
setting a CCA intolerant bit in a management frame to indicate that the apparatus cannot tolerate a CCA level above the CCA threshold;
sending a first wireless message comprising an instance of the management frame to one or more wireless station (STA) devices in wireless proximity to the apparatus informing the one or more STA devices of the CCA threshold and instructing the one or more STA devices to avoid CCA levels exceeding the CCA threshold on the wireless channel; and
sending a second wireless message comprising another instance of the management frame to a wireless access point (AP) device associated with the apparatus informing the AP device of the CCA threshold and instructing the AP device to broadcast use of the CCA threshold on the wireless channel.

9. The method of claim 8, comprising:
broadcasting the first wireless message comprising the instance of the management frame to the one or more STA devices.

10. The method of claim 8, comprising:
unicasting the second wireless message comprising the other instance of the management frame to the AP device.

11. The method of claim 8, comprising:
establishing the CCA threshold based on one or more attributes, the one or more attributes comprising one or more of transmission power, antenna configuration, frequency of operation or modulation technique.

12. The method of claim 8, comprising:
broadcasting the first wireless message to one or more STA devices associated with a different WLAN than the apparatus.

13. A system for dynamically setting a clear channel assessment (CCA) threshold in a wireless local area network (WLAN), comprising:
a processor component of a device;
memory coupled to the processor component;
a radio coupled to the processor component;
one or more antennas coupled to the radio; and
logic for execution by the processor component, the logic to:
establish a CCA threshold for a wireless channel of the WLAN,
set a CCA intolerant bit in a management frame to indicate that the apparatus cannot tolerate a CCA level above the CCA threshold,
send a first wireless message comprising an instance of the management frame to one or more wireless station (STA) devices in wireless proximity to the apparatus informing the one or more STA devices of the CCA threshold and instructing the one or more STA devices to avoid CCA levels exceeding the CCA threshold on the wireless channel, and
send a second wireless message comprising another instance of the management frame to a wireless access point (AP) device associated with the apparatus informing the AP device of the CCA threshold and instructing the AP device to broadcast use of the CCA threshold on the wireless channel.

14. The system of claim 13, the logic to broadcast the first wireless message comprising the instance of the management frame to the one or more STA devices.

15. The system of claim 13, the logic to unicast the second wireless message comprising the other instance of the management frame to the AP device.

16. The system of claim 13, the logic to establish the CCA threshold based on one or more attributes of the system, the one or more attributes comprising one or more of transmission power, antenna configuration, frequency of operation or modulation technique.

17. The system of claim 13, the system comprising one or more of a low power device or a sensor device and one or more of the wireless STA devices comprising a high power device.

18. The system of claim 13, the logic to broadcast the first wireless message to one or more STA devices associated with a different WLAN than the system.

19. The system of claim 13, the WLAN comprising a wireless fidelity (WiFi) network or a high efficiency WiFi (HEW) network.

* * * * *